C. B. BROWN.
Clothes-Line Poles.
No. 136,641.        Patented March 11, 1873.
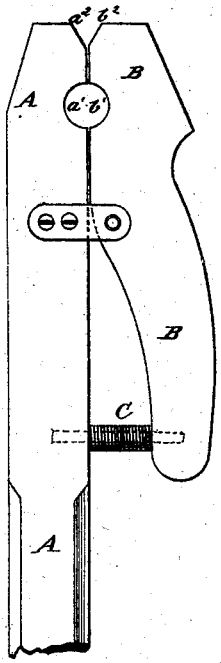
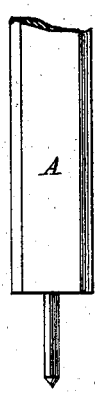

UNITED STATES PATENT OFFICE.

CHARLES B. BROWN, OF NEW ROCHELLE, NEW YORK.

IMPROVEMENT IN CLOTHES-LINE POLES.

Specification forming part of Letters Patent No. 136,641, dated March 11, 1873.

*To all whom it may concern:*

Be it known that I, CHARLES B. BROWN, of New Rochelle, in the county of Westchester and State of New York, have invented a new and useful Improvement in Clothes-Line Poles, of which the following is a specification:

The figure is a side view of my improved clothes-line pole.

My invention has for its object to furnish an improved pole for supporting a clothes-line between the posts or other points of support to prevent it from sagging with the weight of the clothes, and which shall be so constructed that the line cannot be blown from the pole however much it may be swung about by the wind. The invention consists in an improved clothes-pole, formed by the combination of the hinged arm and coiled spring with the upper part of the pole, said parts being provided with half-round notches in their adjacent faces, and with bevels upon the adjacent edges of their ends, as hereinafter fully described.

A represents the main body of the pole, which is made of suitable length and size. The lower end of the pole A is pointed, or has a spike attached to it, to enable it to keep its place upon the ground. B is an arm, which is pivoted or hinged to the upper part of the pole A by two straps or other convenient means. The upper part of the arm B is so formed as to fit closely against the upper part of the pole A. The lower part of the arm projects downward and outward to serve as a lever or handle in operating it. C is a coiled-wire spring interposed between and secured to the pole A and lower part of the arm B to hold the upper end of said arm pressed closely against the upper part of the pole A. In the adjacent faces of the upper parts of the pole A and arm B, near their upper ends and directly opposite each other, are formed half-round notches $a^1$ $b^1$ to receive the clothes-line. The adjacent edges of the upper ends of the pole A and arm B have bevels $a^2$ $b^2$ formed in them, as shown in the figure, so that by placing the said notch against the clothes-line and pushing upon it the jaws will be forced apart and the cord will slip down into the notches in the faces of said parts, and will be held there securely by the force of the spring C.

Having thus described my invention, I claim as new and desire to secure by Letters Patent—

An improved clothes-line pole, formed by the combination of the hinged arm B and coiled spring C with the upper part of the pole A, said parts being provided with half-round notches $a^1$ $b^1$ and bevels $a^2$ $b^2$, substantially as herein shown and described, and for the purpose set forth.

CHARLES B. BROWN.

Witnesses:
JAMES T. GRAHAM,
T. B. MOSHER.